W. L. DEMING.
ACCOUNT CABINET.
APPLICATION FILED JUNE 13, 1910.
1,092,564.
Patented Apr. 7, 1914.
5 SHEETS—SHEET 1.
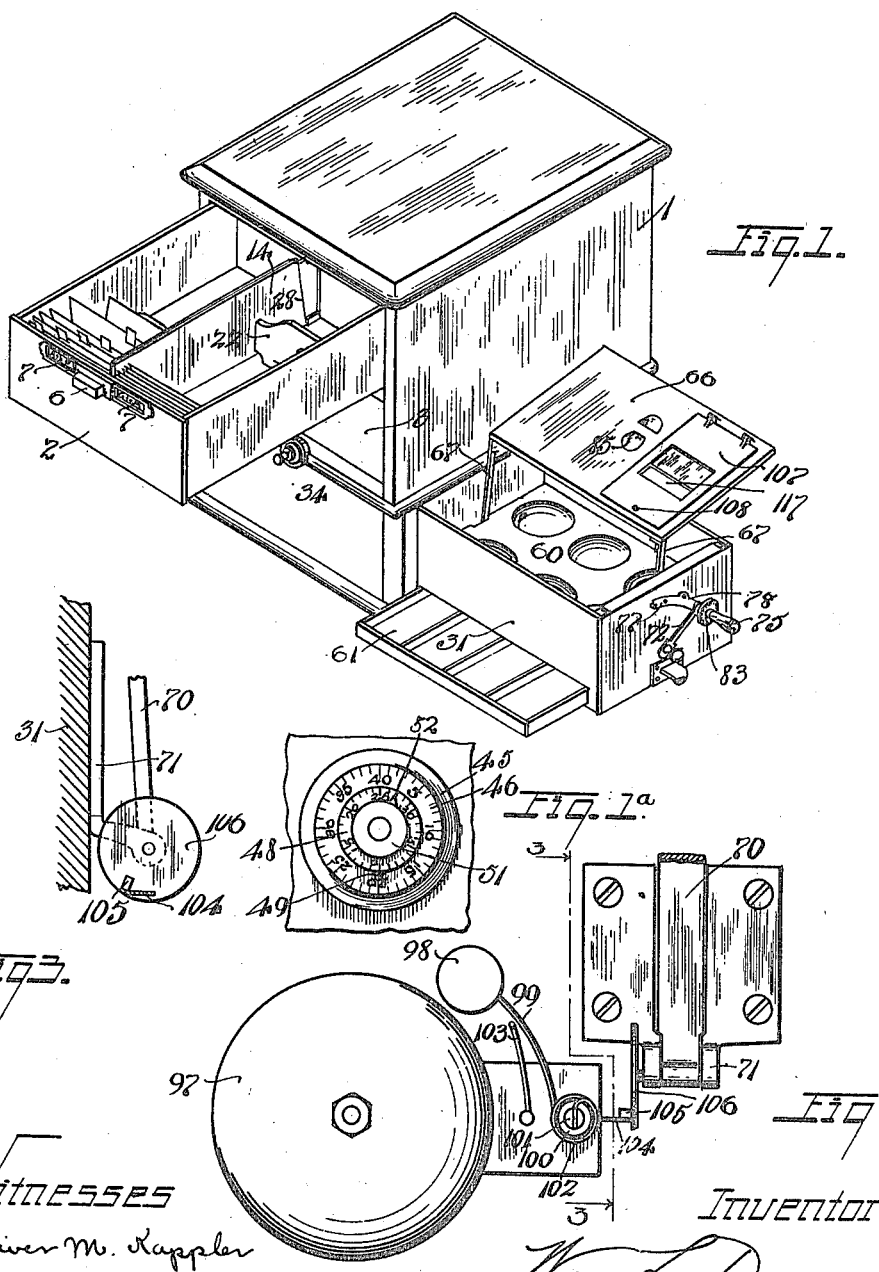

W. L. DEMING.
ACCOUNT CABINET.
APPLICATION FILED JUNE 13, 1910.
1,092,564.
Patented Apr. 7, 1914.
5 SHEETS—SHEET 2.
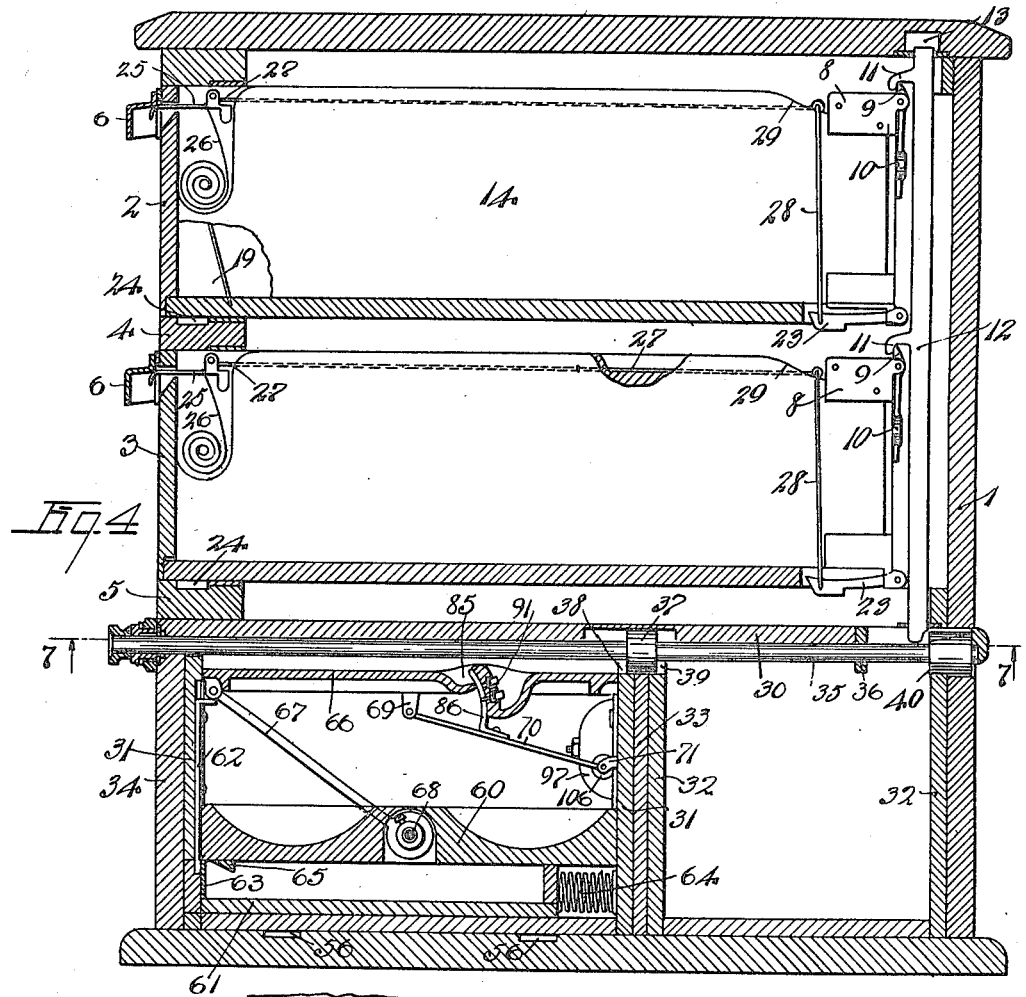

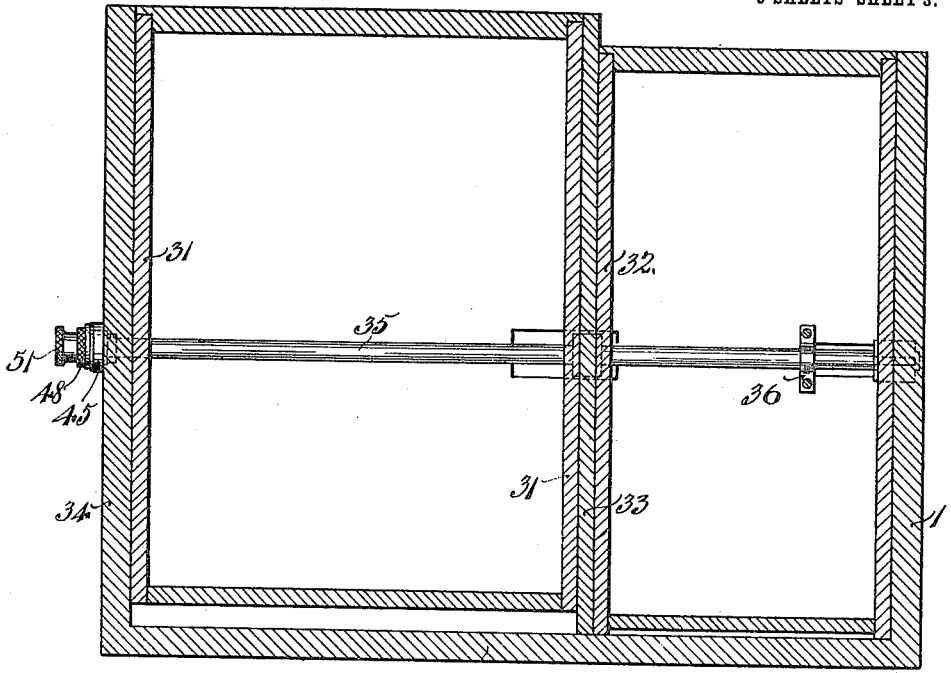
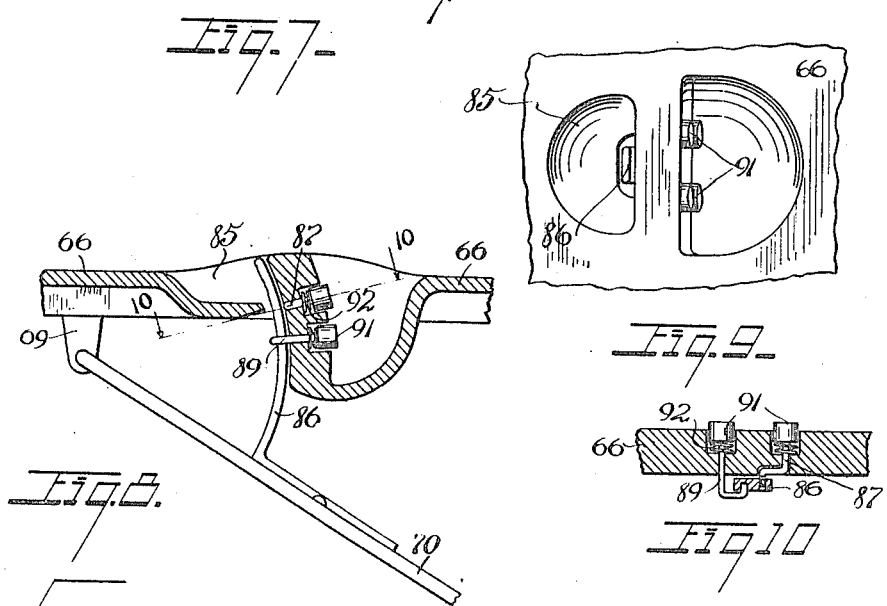

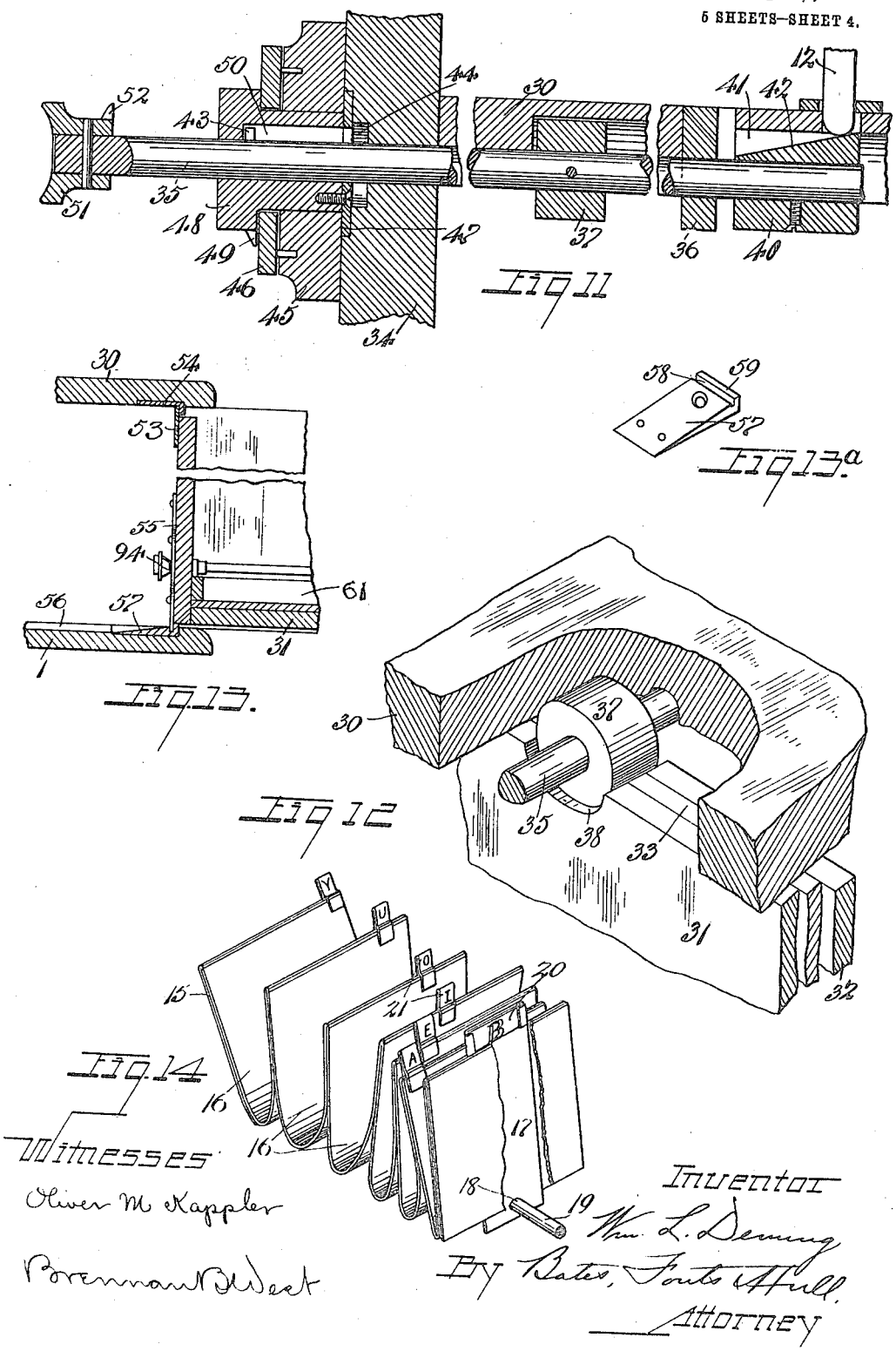

W. L. DEMING.
ACCOUNT CABINET.
APPLICATION FILED JUNE 13, 1910.
1,092,564.
Patented Apr. 7, 1914.
5 SHEETS—SHEET 5.
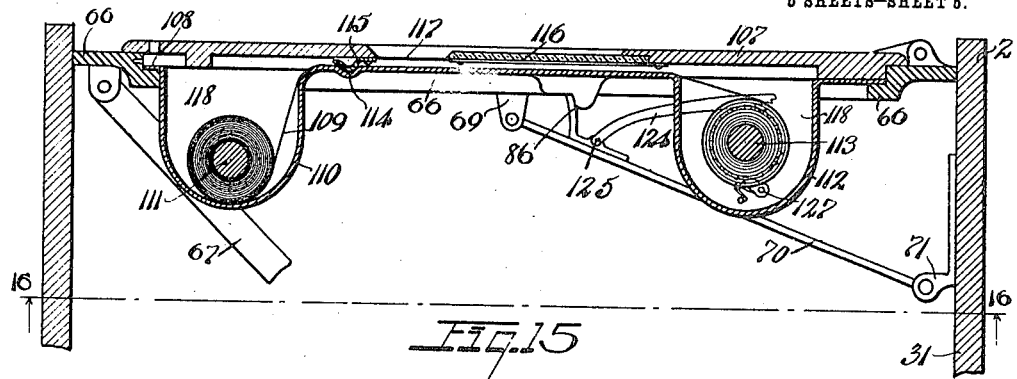
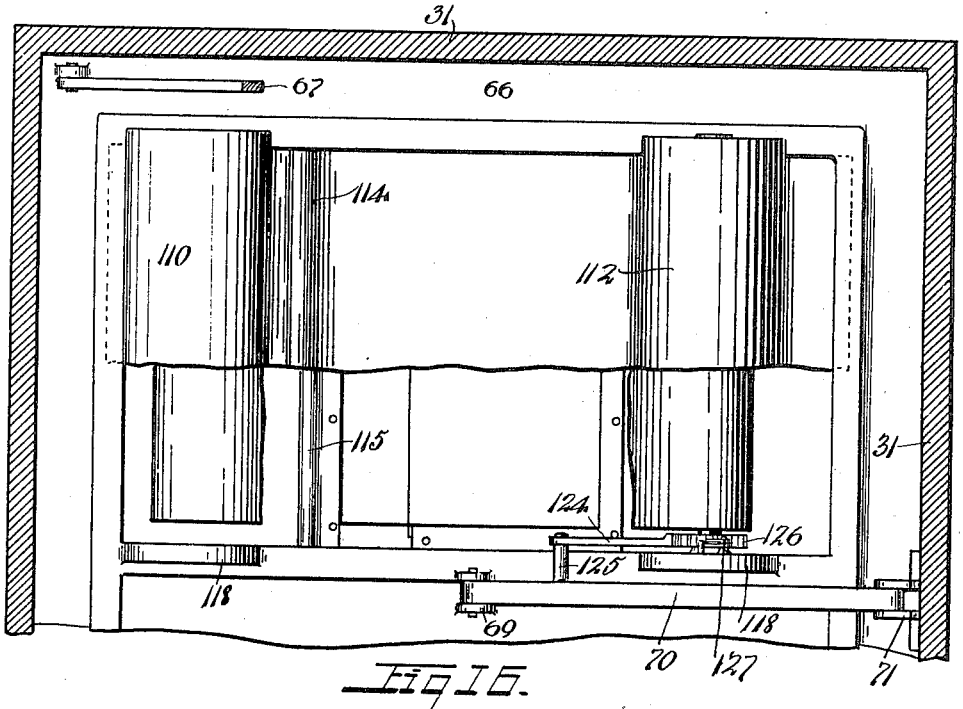
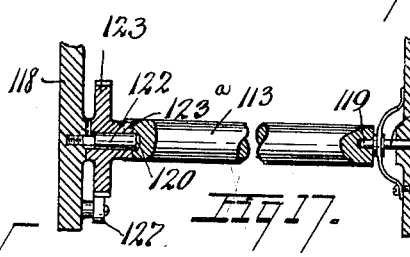
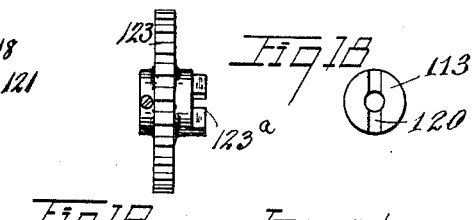
Witnesses
Oliver M. Kappler.
Brennan B. West.
Inventor
Wm. L. Deming
By Bates, Fouts & Hull
Attorney

UNITED STATES PATENT OFFICE.

WILLIAM L. DEMING, OF SALEM, OHIO.

ACCOUNT-CABINET.

1,092,564.

Specification of Letters Patent.

Patented Apr. 7, 1914.

Application filed June 13, 1910. Serial No. 566,536.

*To all whom it may concern:*

Be it known that I, WILLIAM L. DEMING, a citizen of the United States, residing at Salem, in the county of Columbiana and State of Ohio, have invented a certain new and useful Improvement in Account-Cabinets, of which the following is a full, clear, and exact description, reference being had to the accompanying drawings.

My invention relates to cabinets for use by merchants and others in keeping their accounts, the same being adapted for filing, according to a thoroughly classified system, all account slips and other memoranda relating to credit or charged transactions, and for receiving and holding, in a normally inaccessible compartment, money in various denominations for use in connection with cash transactions.

The object of the invention, more specifically stated, is the production of a cabinet of the character specified in which the account slips and other memoranda are classified and filed in drawers or sliding compartments that are under control of a lock of the combination type, the drawers being inaccessible to all except those who understand the combination of the lock; in which the money for the cash part of the business is contained in a drawer or receptacle which is also under control of the same combination lock; in which the said receptacle is normally covered by a writing desk that is under control of a second combination lock and that may be moved from its position covering the cash receptacle into a position at one side of the latter, in which second position it shall stand at an angle from the horizontal such as will make it convenient for use as a writing table for a person in front of the cabinet; and in which various other advantageous features of construction are combined with those above enumerated. All of these parts are contained within a suitable cabinet or casing so that all cash and accounts are maintained in secrecy and in safe condition.

The characteristics of the cash drawer which I prefer to employ in my cabinet, and which is illustrated herein, are covered in a divisional application filed June 28th, 1911. The combination lock shown independently of the mechanism for acting on the various drawers is claimed in my application No. 591,548, filed November 10, 1910. For the completest understanding of the present invention I have shown herein and fully described the particular characteristics of both the cash drawer and lock.

In the drawings forming a part of this application, Figure 1 is a perspective view of my invention, the same showing one of the account slip drawers in an open position, and also showing the cash drawer opened and the writing table raised; Fig. 1ª is a front elevation of the main combination lock; Fig. 2 is a front elevation of the alarm mechanism; Fig. 3 is a detailed sectional view taken on the line 3—3 of Fig. 2; Fig. 4 is a central vertical section taken through the cabinet with all of the parts in their normal or closed positions; Fig. 5 is a view partly in section and partly in elevation, of the mechanism for unlocking and raising the writing table and for opening and closing the cash receptacle; Fig. 5ª is an enlarged view of a portion of Fig. 5; Fig. 6 is an elevation of the structure shown in Fig. 5 as viewed from the left hand end; Fig. 7 is a sectional view taken horizontally through Fig. 4 on the line 7—7 and looking in the direction of the arrows thereon; Figs. 8, 9 and 10 are detail views showing a combination lock connected with the writing table for preventing unauthorized persons from lifting the latter and thereby exposing the cash, Fig. 10 being taken on line 10—10 of Fig. 8; Fig. 11 is a detail view, partly in section and partly in elevation, of the main locking shaft and of certain of the parts controlled thereby. Fig. 12 is a perspective view, with parts broken away, showing a detail of the main locking rod in position for locking both the cash drawer and an auxiliary drawer alongside the cash drawer; Fig. 13 is a sectional view taken vertically through the rear end of the cash drawer and showing the devices for locking the said drawer in its open position; Fig. 13ª is a perspective view of a locking plate or keeper that is shown in section in Fig. 13; Fig. 14 is a perspective view of one of the vowel-indexed account slip holders, the same being attached from its receptacle; Fig. 15 is a sectional view taken vertically through the writing table, the latter being in its closed position, said view showing the recording strip and the mechanism for feeding the same; Fig. 16 is a sectional view taken horizontally through Fig. 15 on the line 6—6 and looking in the direction of the arrows thereon, the housing being partly broken away; Fig. 17 is a view, partly in section and partly in elevation, of the feeding mechanism and roller for the record strip; Fig. 18 is an end elevation of one of the rollers, and Fig. 19 is a side elevation of the ratchet wheel for driving the feeding roller.

Taking up a detailed description of my invention by the use of the reference characters appearing on the drawings, 1 represents the casing or cabinet containing the operating parts of my invention, which casing may be made according to various designs and of various materials. As shown in the drawings, the casing consists of the vertical sides and of the horizontal top and bottom. The upper part of the casing or cabinet is adapted to receive the sliding filing-drawers 2 and 3, the spaces for said drawers being separated by a horizontal member 4 upon which the upper drawer slides. Below the lower drawer-space is another horizontal member 5, upon which the latter drawer is adapted to slide. Each of the drawers 2 and 3 is provided on its forward end with a hand pull 6, with which I prefer to combine label holders 7, see Fig. 1, one of these holders being placed on each side of the drawer-pull. At the upper part of their rear ends the drawers are each provided with bracket members 8, in each of which there is pivoted a drawer latch 9, said latches having weighted tail pieces 10 so that they normally hang by gravity in vertical position, as shown in Fig. 4. The latches 9 are adapted to engage with hooked projections 11 on a vertically sliding bar 12 that is situated at the rear of the cabinet opposite the centers of the drawers. This bar is suitably guided for vertical movement, the top of the cabinet being recessed at 13 to permit of such movement. The bar normally rests by gravity in its lower position, as shown in Fig. 4, in which position the hooked projections 11 are in position to engage the latches 9 when the drawers are pushed inwardly. In case either drawer is inserted while the bar 12 is in its lower position, its latch 9 engages with its respective hooked projection, which engagement swings the latch forwardly and the weighted end 10 of the latter rearwardly, thereby permitting the latch to pass said projection, the bar 12 being raised slightly as the drawer closes. After the latch has once been caught by this projection, it can be released only by lifting the latch bar 12 in a manner hereinafter specified.

The drawers 2 and 3 are intended to hold, in classified order, all account slips or other memoranda relating to the proprietor's current charge or credit business. Any number of these drawers may be employed, and they may be of sufficient width for holding any number of sets of account slips side by side. The drawings show the drawers divided by a central partition 14 into two parallel compartments. For filing the account slips, I prefer to employ the slip holders shown in Fig. 14, and also in Fig. 1, said holder comprising a strip 15 of suitable flexible material, said strip being folded backwardly upon itself so as to form a plurality of vertical pockets 16. For retaining the holder within the drawer compartment, I secure between the first two folds at the forward end of the strip a stiffening plate or member 17, the lower end of which is perforated at 18 to slide over a rod 19 in the bottom of the drawer. The stiffening member preferably projects above the folds of the strip and has its side edges turned inwardly to form a holder for an alphabetical index-label 20. At the upper ends of each fold I attach a small tag 21, the successive tags being lettered with the successive vowels. Each drawer compartment contains a plurality of holders and at the rear of the last holder, is a follower 22, the same being adjustable back and forth in its compartment.

With this description it is believed that the system of classification will be understood; but it may be stated that the label holder 7 on the outside of the drawer for a compartment carries a label designating the first letters in the names filed in that compartment. Thus, the left hand compartment of the drawer 2 is labeled "A to F", which signifies that the accounts of all parties whose names begin with the letters A to F are filed in that particular compartment. The accounts of all parties whose names begin with B, for instance, are filed in an individual holder 15, as shown in Fig. 14, the initial "B" appearing on the label 20 at the front of that holder. If the party's name should be "Barrett", the account slip is filed in the compartment 16 that is labeled "A", that letter being the first vowel after the initial letter. If his name should be "Byers", his slip would be filed in compartment "Y" of the "B" holder. According to this system, the accounts may be very thoroughly and conveniently classified. If desired, the slips may be inserted in envelops and the envelops filed in the holders.

For holding the drawers 2 and 3 in their fully opened position, I pivot to the rear end of each a latch 23, the same being adapted to engage in a recess or keeper 24 in the members 4 and 5 while the drawers are in open position. At the same time, the latch 9 of the drawer abuts against stops at the front of the casing, and the drawer is thus prevented from tipping. The open drawer cannot, therefore, be again closed until its latch 23 is lifted. This operation is effected by drawing forwardly a plate 25 that is concealed beneath the drawer pull 6, the plate having a down turned forward edge with which the fingers may engage. This plate is held in its normal rearward position by a spiral spring 26 that is engaged at one of its ends with the plate, and that is secured at its opposite end to the drawer. Each plate 25 is connected with its respective latch 23 through rods 27 and 28, the rod 27, for convenience, lying in a groove in the upper edge of the drawer partition 14, and the rod 28 extending, by preference, on both sides of the partition so as to form a yoke. The upper rear corner of the partition is rounded or beveled at 29 so that, when the rod 27 is drawn forwardly, the rod or yoke 28 and its latch 23 are lifted until the latter is released from its notch or keeper 24, at which time the drawer may be returned to its closed position.

Below the compartments for the drawers 2 and 3, the casing or cabinet is divided horizontally by a partition 30, below which partition there are compartments for the cash drawer 31 and for the auxiliary drawer 32, said drawers being separated by a vertical partition 33. The front of the casing opposite the cash drawer is permanently closed by a casing member 34, and the cash drawer is opened from the right hand side of the cabinet, moving in a direction at right angles to the movement of the drawers 2 and 3. The auxiliary drawer 32 likewise opens through the side of the cabinet, and preferably in the same direction as the cash drawer, being parallel to the latter.

In its normal condition, the filing cabinet has all of its drawers locked in their closed position so that no unauthorized person can gain access to them. These drawers are all locked by a single rod 35, the same being shown in detail in Fig. 11. This rod is guided by the front of the casing, through which it projects, by the rear wall of the casing, and by a guide plate 36 on the partition board 30. The shaft is adapted for longitudinal movement in its bearings, but it is incapable of such movement except when it is turned into a certain position. In Fig. 4 the rod is shown in its inward and locking position, in which position an enlargement or collar 37 on the rod lies in rounded recesses 38 and 39 in the respective drawers 31 and 32, said drawers being thus locked by the rod in their closed positions. Until the rod 35 is drawn outwardly, therefore, neither of the drawers 31 nor 32 can be opened; and the same is true of the drawers 2 and 3, which are locked until the latch bar 12 is lifted, which operation is effected when the rod 35 is drawn outwardly. The latch bar 12 is lifted by a collar 40 that is secured to the rear end of the rod 35, said collar having a groove 41 extending longitudinally therein, said groove being of a width just sufficient to receive the lower end of the latch bar 12 and having an inclined bottom surface 42 that slides under the latch bar. When, therefore, the rod 35 is turned so as to bring the groove 41 opposite the latch bar 12 and is then drawn outwardly, the inclined surface 42 in the groove lifts the latch bar into the position shown in Fig. 11, thereby lifting the hooked projections 12 above the latches 9, so that the drawers 2 and 3 may be pulled open.

It will thus be seen that the rod 35 cannot be drawn outwardly until the groove 41 is in alinement with the latch bar 12. As a further means for necessitating the turning of the shaft to this particular position, I project from the rod near its front end a pin 43, said pin lying within a circumferential recess 44 in the front member 34 of the casing when the shaft is in its inner position, as shown in Fig. 4. While this pin is in this recess, the rod may be freely turned. Secured in any suitable manner to the front of the casing member 34, and surrounding the rod 35, is a disk 45, the same carrying a graduated index plate 46 on its outer face. Journaled within the disk and index plate, and secured therein by a plate or washer 47, is a sleeve 48, the same having a pointer 49 that swings over the index plate 46 as the sleeve is turned. This sleeve 48 has a groove 50 on its interior, said groove extending throughout the greater part of the length of the sleeve and being adapted to receive the pin 43 when the latter is brought opposite the groove and the rod is than drawn outwardly. The sleeve 48 may be turned freely in the disk and index plate, and the rod 35 may be turned freely in said sleeve as long as the pin 43 is in the circular recess 44. The outer face of the sleeve 48 is provided with a graduated index, and the rod 35 has a head 51 secured to its outer end, by means of which it may be turned, said head having a pointer 52 which swings across the index on the sleeve 48 as the rod or sleeve is turned.

The structure thus described constitutes a combination lock which is set for unlocking by turning the sleeve 48 and the head 51 of the rod until the pointers 49 and 52 are directed to the proper index marks, at which time the rod may be drawn outwardly to simultaneously unlock the drawers 31 and 32 and the drawers 2 and 3, as hereinbefore described. By using the sleeve 48, the number of possible combinations of the lock is measured by the product of the highest numbers on the two indexes.

Having been unlocked by withdrawing the rod 35 until the collar 37 thereon disengages the recess 38 in its side, the drawer 31, which I shall term the cash drawer, may now be pulled open into the position shown in Figs. 1 and 13, or until a plate 53 on the top of the rear end of the drawer engages with a stop plate 54 that is secured to the partition 30. As will be hereinafter described, I support a writing table from the cash drawer; and, for this reason, I desire to support the cash drawer rigidly when in its open position. I therefore attach to the rear end of the drawer 31 a yoke-shaped locking plate 55, as shown in elevation in Fig. 6, said plate being guided on the drawer by pin and slot connections, and having its lower ends traveling in grooves 56 in the bottom of the casing, the yoke dropping by gravity until these ends are in the grooves. At their outer ends, these grooves are provided with keeper plates 57, one of the same appearing in perspective in Fig. 13ª. Each of these plates has an inclined upper surface that rises from the bottom of the groove 56 and terminates in a transverse slot 58, beyond which slot is an upwardly extending lip 59 against which the yoke engages to arrest the outward movement of the drawer, said yoke then dropping into the slots 58 in the keeper plates 57, thereby holding the drawer rigidly in its outer position.

Within the cash drawer 31 I place a till 60 for coins, the same being provided with suitable rounded pockets in which the coins of the various denominations are separately contained. This till is stationary with respect to the cash drawer. Below the till 60 is a small drawer 61 for containing paper money, said drawer being preferably divided into a series of compartments for containing the various denominations of bills. This drawer is normally held in its closed position by a catch 62 that is guided for vertical movement on the inside of the front wall of the cash drawer 31, said catch engaging with a keeper plate 63 on the currency drawer. The latter drawer is adapted to slide in and out of the cash drawer through the front wall of the same, its movement, therefore, being at right angles to the movement of the cash drawer. At the rear of the drawer 61 is an ejecting spring 64, the same being placed under tension when the latter drawer is closed, and serving to eject the drawer whenever the catch 62 is lifted, the drawer being prevented from coming entirely out of the cash drawer by a stop lug 65 on the coin till 60, said lug engaging with the rear end wall of the drawer 61.

Normally, the cash drawer is closed at its top by a writing table 66, the same fitting within the upper part of the drawer. When it is desired to reach the cash in the drawer, it is necessary to remove the table from this position; and, as I desire to use this table for carrying a record strip upon which the operator writes his memoranda of sales, I prefer to so mount the table as to cause it to swing bodily up and to the rear of the cash drawer, and to have it lie in an inclined plane when in the latter position, as this is the most convenient position for writing. I accordingly pivot the front edge of the table to a pair of arms 67, there being preferably one of said arms at each end of the table, and I rigidly secure these arms to a tubular rock shaft 68 that is journaled in the cash drawer below the coin till, the latter being recessed on its lower side to receive the shaft. Near the center of the table I pivot in bracket members 69 a supporting plate or member 70, the latter being somewhat shorter than the arms 67, and being pivoted in bracket members 71 to the rear wall of the cash drawer at a point above the tubular shaft 68. When the table is swung into the position shown in Fig. 1, the member 70 stands in an approximately vertical direction; and, owing to the elevation of its lower end above the shaft 68, the table is held in the inclined position indicated.

The table 66 is swung into its open position by the rotation of the tubular shaft 68; and, for rotating the shaft, I secure to its outer end, beyond the cash drawer, a hand crank 72, the latter having a tubular boss 73 projecting outwardly from its free end. Secured within the tubular boss is a tubular housing 74, the same projecting outwardly some distance beyond the boss. Journaled upon the projecting part of the housing is a handle member 75, the same having an inwardly projecting plunger-rod 76 secured therein, said rod projecting through the tubular housing 74 into position for engagement with notches or holes 77 in a segment plate 78, the latter being secured to the outer end of the cash drawer and being bent in a curve that is concentric with the tubular shaft. I preferably employ but a single pair of the holes 77, the same being located in position for engagement by the plunger-rod 76 when the crank handle is in its extreme positions. The plunger rod 76 is drawn toward the segment 78 by a spring 79 within the handle, the spring being secured at one end to the plunger and at its opposite end to the tubular housing.

In order to prevent unauthorized movement of the table and exposure of the cash, the crank handle 72 is under control of a combination lock, of which the boss 73 and the plunger-rod 76 form the coöperating members. The inner end of the tubular boss is provided with a circular recess 80 within which a pin 81, that projects from the plunger-rod, may move while said rod is in its inner position, at which time the handle 75 and the plunger-rod may be freely rotated. At one point in the bottom of the recess 80, I form a notch 82, into which the pin 81 may be received. When the handle has been rotated so as to bring the notch and pin into register, the handle may be pulled outwardly against the tension of its spring 79, until the plunger 76 clears the segment 78, when the hand lever may be swung and the tubular shaft 68 rocked, such movement resulting in swinging the table 66. As an index to the position of the pin 81, I secure to the handle 75 a graduated disk 83, with which coöperates a stationary pointer 84 on the boss 73.

It will be observed, by referring to Figs. 4 and 15, that the arms 67 must propel the table rearwardly in a direction that does not vary greatly from the direction of the member 70, and that the latter tends to hold the table against such movement. I therefore provide means by which the table may be partially lifted by hand in starting it toward its open position; and I therefore provide a recess 85 in the upper surface of the table into which the operator may engage his thumb or finger to lift the table. He may, of course, lift directly on the table itself; but I prefer to have him engage and lift on a curved arm 86 that projects from the pivot member 70 and extends through the table into the recess 85 thereof. This curved member I also use as one part of an additional lock for the table, the remaining parts of the lock comprising spring-pressed plungers 87 and 89, the positions of the ends of the plungers, with respect to the curved member, being indicated in Fig. 10. Each of these plungers is provided with a head or button 91 that is adapted to be depressed into a socket in the table, the spring 92 for each plunger being located in the socket beneath the head of the latter. Certain of the plungers are adapted to normally extend into sockets on the under side of the curved member 86, and the remaining plungers are adapted to be depressed into corresponding sockets on the upper or outer side of the member, but being normally out of engagement therewith. The curved member can be released, therefore, only by the depression of the proper combination of plungers. Before the table can be lifted to expose the cash, therefore, the operator must not only turn the handle 75 until he secures the proper indication at the pointer 84 so that the plunger 76 may be drawn outwardly, but he must depress the proper combination of buttons 91. These buttons may be more conveniently operated by the fingers of the left hand, as the thumb of that hand may, at the same time, be inserted under the end of the curved member 86 so that the latter may be lifted. Simultaneously with this operation, the crank handle may be turned with the right hand.

As has been stated, the cash drawer is locked in its open position by the engagement of the yoke 55 with the keeper plates 57. In order to disengage these parts, I extend a rod 93 through the tubular rock shaft 68, and secure a conical head 94 to its rear end, said head extending beneath the central part of the yoke in a position to lift the latter when the rod 93 is pulled outwardly, which operation may be effected by pulling on a knob 95 at the outer end of the cash drawer. Normally, the rod is held in its inner position by a spring 96 that is coiled about its front end at the rear of the knob 95, as indicated in Fig. 5.

As an additional safeguard against tampering with the cash drawer, I provide an alarm bell 97, the same having a striker 98 that is carried upon the end of a spring 99, the latter being secured to a sleeve 100 that is journaled on a stud 101. A coiled spring 102 tends to throw the striker against the bell; but the latter is normally held out of contact with the bell by a spring arm 103 that engages with the spring 99. The sleeve 100 and the striker are rocked against the tension of the spring 102 by an arm 104 on the sleeve, said arm being adapted to be engaged and depressed by a lug 105 on a disk 106, the latter being so secured to the member 70 as to turn therewith when the table is lifted. It will be understood, therefore, that the bell is sounded each time that the table is lifted.

I prefer to provide a record strip in connection with the writing table upon which the operator may note any desired memoranda regarding a transaction, and to provide means for feeding said strip along step by step as the table is moved. I therefore pivot to the rear edge of the table near one of its ends a cover plate 107, the same being provided with a suitable lock at its front end for holding the same in closed position, the lock being indicated at 108 in Figs. 1 and 15. The table 66 has an opening beneath the cover plate 107; and, within said opening, I support a housing member for the record strip 109, said member being bowed downwardly at 110 to provide a receptacle for the supply roller 111 of the record strip, and being similarly bowed downwardly at 112 to form a receptacle for the take-up roller 113 of the strip. Between the bowed portions 110 and 112, the member is substantially parallel to the cover-plate 107, except for a small rounded groove 114 into which a spring tongue-plate 115 on the cover-plate bears for producing a friction upon the record strip so that it will not move too easily. Near its center, and above the housing member, the cover-plate 107 is provided with an opening, the greater part of which is closed by a plate of glass or other transparent substance 116 so that several of the last transactions made on the strip will remain in view. The memoranda are written on the strip through an aperture 117 at the edge of the plate 116. The receptacles for the record strip rollers 111 and 113 are closed at their ends by lugs 118 that project downwardly from the writing table, so that the writing strip is entirely inaccessible from the under side of the table, and can only be reached by operating the lock 108 and lifting the cover-plate 107. As the key to the lock is retained by the proprietor, unauthorized access to the record strip is effectually prevented.

The roll of paper upon the roller 111 simply rests in the bottom of its receptacle 110; but the roller 113 is journaled in the lugs 118 at the ends of the receptacle 112, the specific construction of this roller being shown in Fig. 17, from which it will be seen that the roller proper 113 is provided in one of its ends with a socket 119, while in its opposite end is a slot 120, the same being enlarged at its center. Projecting from one of the lugs 118 into the socket 119 is a spring-pressed plunger or pin 121, upon which the roller is journaled at this end. Projecting from the opposite lug 118 and carrying the other end of the roller 113, is a stud 122. Upon this stud is journaled a ratchet wheel 123 which drives the roller 113 through the engagement of its clutch face 123$^a$ with the slot 120 in the end of the roller, and the ratchet wheel is turned by a ratchet bar 124 that is pivoted on a stud 125 that projects from the link 70 of the table, said ratchet bar having teeth on its under side near its free end to engage with teeth of the ratchet wheel. As the table 66 is opened and the link 70 rises toward its vertical position, the ratchet bar 124 is drawn forwardly a slight distance over the ratchet wheel until new teeth on the bar and wheel are brought into engagement. Subsequently, when the table is closed, the ratchet bar is restored to its normal position, and the ratchet wheel and take-up roller are turned slightly, thereby effecting the feed of the record strip. For preventing backward movement of the ratchet wheel, a detent pawl 127 is pivoted on a stud on the inner side of the adjacent lug 118, said pawl being spring-pressed into engagement with the ratchet wheel. As will be seen from Figs. 15 and 16, all of the feeding mechanism, as well as the record strip, is contained within the housing member below the cover-plate 107 so that neither the mechanism nor the strip can be reached except by unlocking and opening the cover-plate 107.

As a matter of economy and convenience I propose to make the rollers 111 and 113 interchangeable, so that when the record strip has been transferred from the supply roller 111 to the roller 113, the roller 113 containing the strip may be filed away and the roller 111 put in its place to receive the next record.

Having thus described my invention, what I claim is:—

1. In a device of the character described, the combination of a casing, a drawer therein, mechanism for locking the drawer including a rotatable and longitudinally movable rod, and a combination lock, the knob of which is connected with the rod, whereby the lock may both release the rod and furnish the means for rotating it.

2. In a device of the character described, the combination of a casing, a drawer therein, means for locking the drawer, including a rotatable and longitudinally movable rod, and a combination lock, the knob of which is mounted on the forward end of the rod and furnishes means for both rotating it and moving it longitudinally.

3. In a device of the character described, the combination of a casing, a pair of drawers therein mounted to move at right angles to each other, a longitudinally movable and rotatable rod, two mechanisms operated thereby for locking the respective drawers, a combination lock adapted to prevent the movement of the rod, said lock furnishing means to rotate the rod into unlocking position.

4. In a device of the character described, the combination with a casing, of a plurality of drawers slidingly mounted in said casing, a longitudinally slidable and rotatable rod mounted in the casing, means controlled by said rod for locking the drawers when the rod is in one position and for unlocking the drawers when the rod is in its other position, and a combination lock controlling the longitudinal motion of said rod and furnishing means for rotating it.

5. In a device of the character described, the combination with a casing, of two drawers slidably mounted in said casing, one above the other, and moving at right angles to each other, a longitudinally slidable and rotatable rod projecting into the casing between the said drawers, means on said rod for engaging directly with one of said drawers when the rod is in one position, thereby locking the last mentioned drawer in its closed position, means controlled by said rod for locking and unlocking the other drawer as the rod is moved longitudinally, and means for preventing the rod moving longitudinally except in a certain position of its rotation.

6. In a device of the character described, the combination with a casing, of an account drawer slidably mounted in said casing, a cash drawer slidably mounted in said casing below the account drawer, said cash drawer moving at right angles to the account drawer and having a notch in its upper edge, a longitudinally slidable rod mounted in said casing between said drawers, a collar on the rod that extends within the notch of the cash drawer when both the cash drawer and the rod are in their inner positions, whereby the cash drawer is locked, a collar on the rear end of said rod, said latter collar having an inclined surface, and means controlled by the inclined surface on the latter collar for unlocking the account drawer.

7. In a device of the character described, the combination with a casing, of a plurality of sliding drawers arranged one above the other within the casing, a drawer catch for and pivoted to each of said drawers, a vertically movable catch bar at the rear of the drawer catches, a hooked projection on said bar for each of the drawer catches, a longitudinally movable rod mounted within the casing, and means on said rod for lifting the catch bar and thus releasing the drawers when the rod is longitudinally moved into one position.

8. In a device of the character described, the combination with a casing, of a plurality of drawers mounted within the casing and slidable therein in one direction, a plurality of drawers mounted in the casing and slidable therein in a direction at right angles to the movement of the other drawers, the latter drawers each having a notch in one of its walls, a longitudinally slidable rod between the two sets of drawers and movable in the same direction as the first set of drawers, a collar on said rod that extends within the notches of the second set of drawers when both the rod and the drawers of the second set are in their inner positions, whereby the said second set of drawers are locked, a drawer catch for and pivoted to each of the drawers of the first set, a slidable catch bar, a hooked projection on said bar for each catch of the drawers of the first set, a second collar on the rod, said second collar being out of engagement with the catch bar when the rod is in position for locking the drawers of the second set, but lifting the catch bar as the rod is moved to unlock the drawers of the second set, said lifting movement of the bar disengaging the hooked projections from the drawer catches whereby the drawers of the first set are also unlocked, and a combination lock adapted to prevent the movement of the rod so that all drawers are locked until the rod is unlocked and is moved.

9. In a device of the character described, the combination of a casing, a drawer mounted therein, a second drawer below the drawer first mentioned and movable at right angles to it, a rod extending between the two drawers, means at the rear end of the first mentioned drawer for locking the drawer, and two collars on said rod, one of which may operate said means and the other of which operates to lock the lower drawer.

10. In a device of the character described, the combination, with a casing, of a drawer slidable into the casing from the front, a drawer slidable into the casing from the side, a slidable and rotatable rod, mechanism operated thereby to lock the drawers, and a combination lock accessible from the front adapted to release the rod.

11. In a device of the character described, the combination of a casing, a drawer therein slidable from the front, a drawer therein slidable from the side, an individual cover for the latter drawer, a common lock for the two drawers, and an individual lock for the cover.

12. In a device of the character described, the combination of a casing, a drawer therein slidable from the front, a drawer therein slidable from the side, a rod extending from front to back between the two drawers, means at the rear of the upper drawer for locking it, means whereby the longitudinal movement of the rod operates said means and operates to engage and lock the lower drawer, and a combination lock, the knob of which is mounted on the forward end of said rod.

In testimony whereof, I hereunto affix my signature in the presence of two witnesses.

WILLIAM L. DEMING.

Witnesses:
J. B. HULL,
BRENNAN B. WEST.